United States Patent
Fujii et al.

(10) Patent No.: US 12,202,233 B2
(45) Date of Patent: Jan. 21, 2025

(54) LAMINATES AND LIQUID PACKAGING BAGS

(71) Applicant: PRIME POLYMER CO., LTD., Tokyo (JP)

(72) Inventors: Sumiaki Fujii, Chiba (JP); Masao Suzuki, Chiba (JP); Keiko Sekiya, Chiba (JP); Tetsuya Saitou, Kisarazu (JP)

(73) Assignee: PRIME POLYMER CO., LTD, Tokyo (JP)

( * ) Notice: Subject to any disclaimer, the term of this patent is extended or adjusted under 35 U.S.C. 154(b) by 30 days.

(21) Appl. No.: 16/969,149

(22) PCT Filed: Mar. 18, 2019

(86) PCT No.: PCT/JP2019/011145
§ 371 (c)(1),
(2) Date: Aug. 11, 2020

(87) PCT Pub. No.: WO2019/181842
PCT Pub. Date: Sep. 26, 2019

(65) Prior Publication Data
US 2021/0039364 A1    Feb. 11, 2021

(30) Foreign Application Priority Data

Mar. 20, 2018 (JP) .................. 2018-052641
Jan. 24, 2019 (JP) .................. 2019-010338

(51) Int. Cl.
B32B 27/32 (2006.01)
B32B 7/12 (2006.01)
B32B 27/08 (2006.01)
B65D 65/40 (2006.01)
C09J 7/29 (2018.01)
C09J 7/30 (2018.01)

(52) U.S. Cl.
CPC .............. *B32B 27/08* (2013.01); *B32B 7/12* (2013.01); *B32B 27/32* (2013.01); *B65D 65/40* (2013.01); *C09J 7/29* (2018.01); *C09J 7/30* (2018.01); *B32B 2250/03* (2013.01); *B32B 2250/04* (2013.01); *B32B 2307/72* (2013.01); *B32B 2323/04* (2013.01); *B32B 2439/46* (2013.01)

(58) Field of Classification Search
CPC .............. B32B 15/085; B32B 2250/03; B32B 2250/04; B32B 2255/10; B32B 2255/205; B32B 2307/30; B32B 2307/308; B32B 2307/31; B32B 2307/72; B32B 2307/732; B32B 2323/04; B32B 2439/46; B32B 2439/70; B32B 2439/80; B32B 27/08; B32B 27/30; B32B 27/302; B32B 27/304; B32B 27/306; B32B 27/308; B32B 27/32; B32B 27/327; B32B 27/34; B32B 27/36; B32B 27/365; B32B 27/40; B32B 5/022; B32B 7/12
See application file for complete search history.

(56) References Cited

U.S. PATENT DOCUMENTS

| | | |
|---|---|---|
| 5,371,146 A | 12/1994 | Takahashi et al. |
| 5,459,217 A | 10/1995 | Todo et al. |
| 5,464,905 A | 11/1995 | Tsutsui et al. |
| 5,663,236 A | 9/1997 | Takahashi et al. |
| 5,708,080 A | 1/1998 | Tsutsui et al. |
| 5,834,557 A | 11/1998 | Tsutsui et al. |
| 6,184,297 B1 | 2/2001 | Takahashi et al. |
| 6,333,387 B1 | 12/2001 | Takahashi et al. |
| 2002/0016416 A1 | 2/2002 | Takahashi et al. |
| 2011/0268966 A1* | 11/2011 | Yun ............... B32B 27/327 428/339 |
| 2013/0260122 A1* | 10/2013 | Siu ............... B32B 25/08 525/240 |
| 2018/0354696 A1* | 12/2018 | Hernandez ....... B32B 27/32 |

FOREIGN PATENT DOCUMENTS

| | | |
|---|---|---|
| EP | 2 594 491 A1 | 5/2013 |
| JP | H06-009724 A | 1/1994 |
| JP | H06-136195 A | 5/1994 |
| JP | H06-136196 A | 5/1994 |

(Continued)

OTHER PUBLICATIONS

Machine translation of JP2012139848A, retrieved Feb. 1, 2022. (Year: 2012).*
SP0540—Mitsui Chemicals (Year: 2005).*
Exact 3040—Exxon Mobil (Year: 2017).*
Affinity PT1450G1—Dow, 2017. (Year: 2017).*
Affinity PT1451G1—Dow, 2012. (Year: 2012).*
Affinity SQ1503UE—Dow, 2009. (Year: 2009).*
Machine translation of JP-2016187934-A, retrieved Feb. 9, 2024 (Year: 2016).*

(Continued)

*Primary Examiner* — Callie E Shosho
*Assistant Examiner* — Krupa Shukla
(74) *Attorney, Agent, or Firm* — Foley & Lardner LLP

(57) ABSTRACT

A laminate is provided which can form packaging bags having a wide range of packaging feasible temperatures and excellent high-speed liquid packaging properties. The laminate includes a sealant layer and an intermediate layer disposed in contact with the sealant layer, the sealant layer including an ethylene/α-olefin copolymer satisfying the requirements (x0) to (x3):

(x0) The copolymer is a copolymer of ethylene and a C3-C20 α-olefin
(x1) The MFR is 1 to 50 g/10 min
(x2) The density is 890 to 910 kg/m$^3$
(x3) $0.35 < \Delta(80)/\Delta < 0.85$ and $0.60 < \Delta(100)/\Delta < 0.85$, wherein ΔH is the total heat of melting observed during DSC and ΔH(T) is the heat of melting observed during heating from 0° C. to T° C.

7 Claims, No Drawings

(56) References Cited

FOREIGN PATENT DOCUMENTS

| JP | H06-207057 | A | | 7/1994 | | |
|----|------------|---|---|--------|---|---|
| JP | H10-119206 | A | | 5/1998 | | |
| JP | H10-315409 | A | | 12/1998 | | |
| JP | H11-254614 | A | | 9/1999 | | |
| JP | 2007-204628 | A | | 8/2007 | | |
| JP | 2008-055759 | A | | 3/2008 | | |
| JP | 2012-139848 | A | | 7/2012 | | |
| JP | 2012-139849 | A | | 7/2012 | | |
| JP | 2012-139854 | A | | 7/2012 | | |
| JP | 2015-182373 | A | | 10/2015 | | |
| JP | 2016-190450 | A | | 11/2016 | | |
| JP | 2016187934 | A | * | 11/2016 | | |
| WO | WO-2011090101 | A1 | * | 7/2011 | ......... | B29C 49/0005 |

OTHER PUBLICATIONS

Machine translation of WO-2011090101-A1, retrieved Feb. 9, 2024. (Year: 2011).*

International Searching Authority, "International Preliminary Report on Patentability and Written Opinion," issued in connection with International Patent Application No. PCT/JP2019/011145, dated Sep. 22, 2020.

International Searching Authority, "International Search Report," issued in connection with International Patent Application No. PCT/JP2019/011145, dated Jun. 18, 2019.

* cited by examiner

LAMINATES AND LIQUID PACKAGING BAGS

RELATED APPLICATIONS

The present application claims priority under 37 U.S.C. § 371 to International Patent Application No. PCT/JP2019/011145, filed Mar. 18, 2019, which claims priority to and the benefit of Japanese Patent Application Nos. 2018-052641, filed on Mar. 20, 2018, and 2019-010338, filed on Jan. 24, 2019. The contents of these applications are hereby incorporated by reference in their entireties.

TECHNICAL FIELD

The present invention relates to a laminate and a liquid packaging bag formed from the laminate. More specifically, the present invention relates to a laminate and a liquid packaging bag formed from the laminate, and to such a liquid packaging bag filled with a liquid, namely, a liquid-filled package bag, and a method for the production thereof.

BACKGROUND ART

Multilayer packaging films that are laminates of a substrate and a sealant layer combined together through an intermediate layer are conventionally used to package liquids, viscous fluids, or liquids or viscous fluids containing insolubles. Liquid packaging bags are known which have a sealant layer as an inner layer and are filled with a liquid or the like through an opening of the bag, the opening being then closed by heat sealing.

Package bags are often produced by three or four side heat sealing of films. When a liquid or the like is bagged at a high speed, leakage may occur through the heat-sealed portions. Thus, laminates that are enhanced in high-speed packaging properties are proposed for use as packaging bags.

Patent Literatures 1 to 3 disclose packaging bags that may be filled with liquids or viscous fluids on automatic packaging machines. These packaging bags use a specific material which exhibits a high viscosity at a low shear rate and a low viscosity at a high shear rate, specifically, a resin composition which has a specific ratio of low-shear viscosity to high-shear viscosity measured at a temperature that will be experienced during the actual packaging process. In particular, specific examples are disclosed in which a composition of ethylene/1-hexene copolymer and high-pressure low-density polyethylene is used in an intermediate layer disposed between a substrate and a sealant layer.

Patent Literature 4 discloses a packaging material having at least one sealant layer on a base film. In this packaging material, the sealant layer includes an intermediate layer including an ethylene/α-olefin copolymer and a crystal nucleating agent, and an innermost layer including an ethylene/α-olefin copolymer. The intermediate layer preferably has a melting point of 90 to 120° C., and a crystallization temperature of 80 to 110° C., and the difference between the melting point and the crystallization temperature is preferably 25° C. or less.

Further, Patent Literature 5 discloses the use of a polyethylene resin composition which includes an ethylene/C3-C20α-olefin copolymer and a high-pressure low-density polyethylene (HPLD) and which has a specific density, a specific MFR and specific elution characteristics with respect to o-dichlorobenzene.

CITATION LIST

Patent Literature

Patent Literature 1: JP-A-2012-139848
Patent Literature 2: JP-A-2012-139849
Patent Literature 3: JP-A-2012-139854
Patent Literature 4: JP-A-H10-315409
Patent Literature 5: JP-A-2007-204628

SUMMARY OF INVENTION

Technical Problem

When an open packaging bag filled with a content is closed by heat sealing, the heat sealing process is performed in a short time and therefore the temperature of a sealant layer needs to be elevated quickly to a temperature which produces a bond of the seal. However, quick heat sealing tends to result in variations in temperature of the portions that are sealed, and product defects are likely to occur due to such variations. It is therefore desirable that packaging bags have a wide range of packaging feasible temperatures (in other words, a wide range of heat-sealing temperatures at which packaging bags filled with a content can be heat sealed favorably).

Unfortunately, packaging bags constructed from conventional multilayer packaging films have a narrow range of packaging feasible temperatures. When, in particular, the packaging bags are produced into liquid packages at a high speed (that is, when the packaging bags filled with a liquid are heat sealed at a high speed to close the opening), product defects occur frequently due to the variations in temperature of the portions that are sealed.

In light of the problems in the art discussed above, objects of the present invention are to provide a packaging bag having a wide range of packaging feasible temperatures and to provide a laminate capable of forming such packaging bags.

Solution to Problem

After extensive studies, the present inventors have found that the above objects can be attained by using a polyethylene resin having a wide melting point distribution as a sealant layer of a multilayer packaging film. The present invention has been completed based on the finding.

For example, the present invention pertains to the following [1] to [7].

[1]

A laminate including a sealant layer (B) and an intermediate layer (C) disposed in contact with the sealant layer (B), the sealant layer (B) including an ethylene/α-olefin copolymer (X) satisfying the following requirements (x0) to (x3):

(x0) the copolymer is a copolymer of ethylene and a C3-C20 α-olefin, (x1) the melt flow rate measured at 190° C. under 2.16 kg load is 1 to 50 g/10 min, (x2) the density is 890 to 910 kg/m$^3$, and (x3) when the copolymer in a differential scanning calorimeter is heated from 0° C. to 200° C. at a rate of 10° C./min, held at 200° C. for 10 minutes, cooled to 0° C. at a rate of 10° C./min, held at 0° C. for 10 minutes and then heated to 200° C. at a rate of 10° C./min, the copolymer satisfies the equations below wherein ΔH is the total heat of melting observed during the second heating in the above process, and ΔH(T) is the heat of melting observed during the second heating in the above process from 0° C. to T° C., $$0.35 \leq \Delta H(80)/\Delta H \leq 0.85 \text{ and}$$

$$0.60 \leq \Delta H(100)/\Delta H \leq 0.85.$$

[2]

The laminate described in [1], wherein the intermediate layer (C) is an intermediate layer including an ethylene resin (Y) satisfying the following requirements (y0) to (y2):

(y0) the resin includes a copolymer of ethylene and a C3-C20 α-olefin, (y1) the melt flow rate measured at 190° C. under 2.16 kg load is 1 to 50 g/10 min, and (y2) the density is 900 to 925 kg/m$^3$.

[3]

The laminate described in [1] to [2], wherein the laminate further includes a substrate layer (A) disposed on a side of the intermediate layer (C) opposite to the sealant layer (B), and the substrate layer (A) includes at least one selected from the group consisting of films including at least one thermoplastic resin selected from the group consisting of polyamide resins, polyester resins, polyolefin resins, polyvinylidene chloride resins, saponified ethylene/vinyl acetate copolymers, polycarbonate resins, polystyrene resins and acrylic resins, metal foils, metal-deposited films, ceramic-deposited films, papers and nonwoven fabrics.

[4]

The laminate described in [3], wherein the laminate includes one or more adhesives interposed between at least portions of the intermediate layer (C) and of the substrate layer (A), the adhesives being selected from the group consisting of polyurethanes, isocyanate compounds, polyesters, and mixtures and reaction products of a polyol and an isocyanate compound.

[5]

A liquid packaging bag formed from the laminate described in any of [1] to [4].

[6]

A liquid-filled package bag including the liquid packaging bag described in [5], and a liquid or a viscous fluid enclosed in the liquid packaging bag.

[7]

A method for producing liquid-filled package bags including:

a step of packaging a liquid or a viscous fluid into the liquid packaging bag described in [5] to produce the liquid-filled package bag described in [6], the liquid-filled package bag being produced as a sheet in which a plurality of the liquid-filled package bags are continuously arranged in a longitudinal direction of the sheet, the sheet being fed at a feed rate of not less than 20 m/min in the longitudinal direction of the sheet.

Advantageous Effects of Invention

The laminates of the present invention can form packaging bags having a wide range of packaging feasible temperatures. Further, the packaging bags of the present invention have a wide range of packaging feasible temperatures and thus can be excellently sealed to produce liquid packages at a high speed.

DESCRIPTION OF EMBODIMENTS

The present invention will be described in more detail hereinbelow.

Laminates

A laminate according to the present invention is a multilayer structure which includes an intermediate layer (C) and a sealant layer (B) disposed in contact with the intermediate layer (C). The laminate may further include a substrate layer (A) on the side of the intermediate layer (C) opposite to the sealant layer (B). The intermediate layer (C) may be disposed over the entirety of one side of the sealant layer (B). The intermediate layer (C) may be disposed on one side of the sealant layer (B) only in the vicinity of a portion of the sealant layer (B) that will be heat sealed when the laminate is used in heat sealing applications.

⟨Substrate Layers (A)⟩

The base material forming the substrate layer (A) is a material that is relatively high in rigidity and strength enough to define the outer surface of a packaging material. Specifically, the material may be at least one selected from films (which may be stretched films) including at least one thermoplastic resin selected from the group consisting of polyamide resins such as nylon 11 and nylon 12, polyester resins such as polyethylene terephthalate and polybutylene terephthalate, polyolefin resins such as polyethylene resin and polypropylene resin, polyvinylidene chloride resins, saponified ethylene/vinyl acetate copolymers, polycarbonate resins, polystyrene resins and acrylic resins, metal foils, metal-deposited films, ceramic-deposited films such as inorganic oxide-deposited films, papers, nonwoven fabrics, and stacks of these materials.

The thickness of the substrate layer (A) is usually about 5 to 50 μm.

The materials, thickness, etc. of the metal foils are not particularly limited. For example, use may be made of aluminum foils, tin foils, lead foils, galvanized thin steel films, thin films of ionized metals formed by electrolysis, and iron foils, each having a thickness of 5 to 50 μm.

The materials, thickness, etc. of the metal-deposited films are not particularly limited. Examples of the metals that are deposited include aluminum and zinc. Usually, those films having a thickness of 0.01 to 0.2 μm are preferably used. Known deposition methods such as vacuum deposition methods, ion plating methods and sputtering methods may be used without limitation.

Examples of the ceramics in the ceramic-deposited films include silicon oxides represented by the general formula $SiO_x$ (0.5×2), glass, metal oxides such as alumina, magnesium oxide and tin oxide, and metal fluorides such as fluorite and selenium fluoride. The metal oxides may contain trace amounts of metals, other metal oxides, or metal hydroxides. Deposition may be performed on at least one side of a film by any of the deposition methods described above. Further, the films to be coated are not particularly limited, with examples including transparent films such as stretched polyester films, polypropylene films and polyamide films.

One or more adhesives selected from the group consisting of polyurethanes, isocyanate compounds, polyesters, and mixtures and reaction products of a polyol and an isocyanate compound are preferably disposed on the side of the substrate layer (A) in contact with the intermediate layer (C) to offer enhanced adhesion between the substrate layer (A) and the intermediate layer (C).

The substrate layer (A) is basically a monolayer (composed of only one layer) but may be composed of a plurality of layers. For example, the substrate layer may be a bilaminar film formed by dry lamination of a polyester film and a ceramic-deposited polyester film, or may be a trilaminar film formed by dry lamination of a polyester film and an aluminum foil followed by dry lamination of a polyester film on the surface of the aluminum foil.

⟨ Sealant Layers (B)⟩

The sealant layer (B) is formed of a material that includes an ethylene/α-olefin copolymer (X) satisfying the following requirements (x0) to (x3) (hereinafter, this copolymer will be also written as the "copolymer (X)").

Requirement (x0):

The requirement (x0) is that the ethylene/α-olefin copolymer (X) is a copolymer of ethylene and a C3-C20 α-olefin.

The α-olefin is preferably a C4-C8 α-olefin. Examples of the α-olefins include propylene, 1-butene, 1-hexene, 1-pentene, 4-methyl-1-pentene, 1-heptene, 1-octene and 1-decene. The α-olefins may be used singly, or two or more may be used in combination.

The proportion of α-olefin-derived structural units in the ethylene/α-olefin copolymer (X) and the kind of the α-olefin are selected appropriately so that the requirements (x1) to (x3) are satisfied.

Requirement (x1):

The requirement (x1) is that the melt flow rate of the ethylene/α-olefin copolymer (X) as measured at 190° C. under 2.16 kg load in accordance with JIS K7210-1 is 1 to 50 g/10 min. The melt flow rate is preferably 3 to 30 g/10 min, and more preferably 4 to 20 g/10 min. When the melt flow rate is in this range, the material exhibits good extrusion processability at the time of the formation of the sealant layer.

Requirement (x2):

The requirement (x2) is that the density of the ethylene/α-olefin copolymer (X) is 890 to 910 kg/m$^3$. The density is preferably 898 to 908 kg/m$^3$. When the density is in this range, good packaging performance may be obtained when a liquid is packaged into a packaging bag formed from the laminate of the present invention.

Requirement (x3):

The requirement (x3) is that when the ethylene/α-olefin copolymer (X) in a differential scanning calorimeter is heated from 0° C. to 200° C. at a rate of 10° C./min, held at 200° C. for 10 minutes, cooled to 0° C. at a rate of 10° C./min, held at 0° C. for 10 minutes and then heated to 200° C. at a rate of 10° C./min, the copolymer satisfies the equations below wherein ΔH is the total heat of melting observed during the second heating in the above process, and ΔH(T) is the heat of melting observed during the second heating in the above process from 0° C. to T° C., $$0.35 \leq \Delta H(80)/\Delta H \leq 0.85 \text{ and}$$

$$0.60 \leq \Delta H(100)/\Delta H \leq 0.85.$$

Preferably, ΔH(80)/ΔH is 0.39 to 0.80, and ΔH (100)/ΔH is 0.65 to 0.83. More preferably, ΔH(80)/ΔH is 0.43 to 0.75, and ΔH(100)/ΔH is 0.70 to 0.81.

ΔH(80)/ΔH and ΔH(100)/ΔH may be controlled to fall within the above ranges by, for example, changing the density or the melting point distribution of the ethylene/α-olefin copolymer used in the sealant layer, or appropriately mixing two or more kinds of ethylene/α-olefin copolymers having different melting point distributions.

In polyethylene resins, the density and the thermal conductivity are proportional to each other. Further, the resins show a lower thermal conductivity in the molten state than in the solid state. Here, a comparison is made between a resin with a narrow melting point distribution and a resin which has a melting peak temperature similar to that of the above resin and a wide melting point distribution. When these resins are heated, the resin with a narrow melting point distribution is completely melted at a lower temperature than the resin with a wide melting point distribution, and thus will heat up at a relatively low rate. In contrast, the resin with a wide melting point distribution will heat up at a relatively high rate because the heating proceeds in the mixture of a melt and a solid.

The satisfaction of the requirement (x3) indicates that the melting point distribution is wide. In the general heat sealing process using a seal bar, the time required to reach the heat sealable temperature is shortened by using, in the sealant layer (B), a resin that satisfies the requirement (x3), specifically, a resin that heats up at a relatively high rate. Thus, the variations in temperature reached by the sealant layers (B) will be reduced even when heat sealing is performed at a high speed. Consequently, a wider range of packaging feasible temperatures will be available, and high-speed packaging properties will be enhanced.

The melting peak temperature (the temperature which gives a melting peak in the DSC curve) during the second heating process is preferably 90 to 105° C.

The copolymer (X) may be prepared using an olefin polymerization catalyst such as a metallocene catalyst, a titanium catalyst, a chromium catalyst or a phenoxyimine catalyst. The copolymer (X) may be a linear or branched, low-density polyethylene. In particular, a polymer prepared with a metallocene olefin polymerization catalyst has a narrow molecular weight distribution and includes a small amount of low-molecular weight and low-density components. Such a metallocene catalyzed copolymer (X) is effective in the application according to the present invention, that is, in the packaging of liquids such as foods and pharmaceuticals.

A metallocene catalyst is usually composed of a metallocene catalyst component (a1) which includes a transition metal compound of Group IVB of the periodic table having at least one ligand with a cyclopentadienyl skeleton, an organoaluminum oxy compound catalyst component (b), a microparticulate carrier (c), and optionally an organoaluminum compound catalyst component (d) and an ionized ionic compound catalyst component (e).

For example, the copolymer (X) may be produced by copolymerizing ethylene and a C3-C20 α-olefin in the presence of a so-called metallocene olefin polymerization catalyst including a metallocene catalyst component that is described in patent literatures such as JP-A-H06-9724, JP-A-H06-136195, JP-A-H06-136196 and JP-A-H06-207057.

The copolymer (X) may be a single copolymer (X) or a mixture of two or more kinds of ethylene/α-olefin copolymers. When the copolymer (X) is a mixture of two or more kinds of copolymers, the copolymers that are mixed may fail to satisfy the requirements (x1) to (x3) as long as the mixture satisfies the requirements (x1) to (x3).

The copolymer (X) may be a material selected from commercially available ethylene/α-olefin copolymers so as to satisfy the requirements (x0) to (x3).

The sealant layer (B) is usually a monolayer (composed of only one layer).

The thickness of the sealant layer (B) is usually about 5 to 100 μm.

In order to attain enhanced oil resistance, the amount of neck-in of the sealant layer is preferably large.

⟨Intermediate Layers (C)⟩

The intermediate layer (C) may be a known intermediate layer, and is preferably formed of a material that includes an ethylene resin (Y) satisfying the following requirements (y0) to (y2).

Requirement (y0):

The requirement (y0) is that the ethylene resin (Y) includes a copolymer of ethylene and a C3-C20 α-olefin.

The α-olefin is preferably an α-olefin having 3 to 20 carbon atoms. Examples of the α-olefins include propylene, 1-butene, 1-hexene, 1-pentene, 4-methyl-1-pentene, 1-heptene, 1-octene and 1-decene. The α-olefins may be used singly, or two or more may be used in combination.

The proportion of α-olefin-derived structural units in the ethylene/α-olefin copolymer (Y) and the kind of the α-olefin are selected appropriately so that the requirements (y1) and (y2) are satisfied.

Requirement (y1):

The requirement (y1) is that the melt flow rate of the ethylene resin (Y) as measured at 190° C. under 2.16 kg load in accordance with JIS K7210-1 is 1 to 50 g/10 min. The melt flow rate is preferably 2 to 40 g/10 min, and more preferably 4 to 30 g/10 min. When the melt flow rate is in this range, the material exhibits good extrusion processability at the time of the formation of the heat seal layer.

Requirement (y2):

The requirement (y2) is that the density of the ethylene resin (Y) is 900 to 925 kg/m$^3$. The density is preferably 902 to 910 kg/m$^3$. When the density is in this range, good packaging performance may be obtained when a liquid is packaged into a packaging bag formed from the laminate of the present invention.

In consideration of heat sealability at a lower temperature, it is preferable that the ethylene resin (X) that forms the sealant layer (B) have a lower melting point (a lower melting peak temperature during the second heating process in a differential scanning calorimeter according to the requirement (x3)) than the copolymer (Y) that forms the intermediate layer (C).

The ethylene resin (Y) may be:
a single copolymer of ethylene and a C3-C20 α-olefin,
a mixture of two or more kinds of copolymers of ethylene and a C3-C20 α-olefin, or
a mixture of a single, or two or more kinds of copolymers of ethylene and a C3-C20 α-olefin, and an ethylene homopolymer. When the ethylene resin (Y) is a mixture of two or more components, the components that are mixed may fail to satisfy the requirements (y1) and (y2) as long as the mixture (that is, the ethylene resin (Y)) satisfies the requirements (y1) and (y2).

The copolymer (Y) may be prepared using an olefin polymerization catalyst such as a metallocene catalyst, a titanium catalyst, a chromium catalyst or a phenoxyimine catalyst. The copolymer (Y) may be a low-density polyethylene, which is linear or branched. In particular, a polymer prepared with a metallocene olefin polymerization catalyst has a narrow molecular weight distribution and includes a small amount of low-molecular weight and low-density components. Such a metallocene catalyzed copolymer is effective in the application according to the present invention.

A metallocene catalyst is usually composed of a metallocene catalyst component (a1) which includes a transition metal compound of Group IVB of the periodic table having at least one ligand with a cyclopentadienyl skeleton, an organoaluminum oxy compound catalyst component (b), a microparticulate carrier (c), and optionally an organoaluminum compound catalyst component (d) and an ionized ionic compound catalyst component (e).

For example, the copolymer (Y) may be produced by copolymerizing ethylene and a C3-C20 α-olefin in the presence of a so-called metallocene olefin polymerization catalyst including a metallocene catalyst component that is described in patent literatures such as JP-A-H06-9724, JP-A-H06-136195, JP-A-H06-136196 and JP-A-H06-207057.

The ethylene resin (Y) may be a commercially available product satisfying the requirements (y0) to (y2).

The intermediate layer (C) is usually a monolayer (composed of only one layer).

The thickness of the intermediate layer (C) is usually about 5 to 100 μm.

Where necessary, the resin (the resin composition) that forms the sealant layer (B) or the intermediate layer (C) may contain known additives such as antiblocking agents, antifogging agents, antistatic agents, antioxidants, weather resistance stabilizers, heat stabilizers and lubricants while still ensuring that the objects of the present invention are achieved.

When the sealant layer (B) or the intermediate layer (C) is formed from a resin composition, the resin composition may be obtained by mixing the copolymer (X) or the ethylene resin (Y) with the additives described above using a mixing device such as a Banbury mixer, a Henschel mixer, a V-type blender or an extruder at room temperature to 250° C. During this process, nitrogen sealing or vacuum sealing may be performed to prevent the occurrence of gelation stemming from the degeneration of the ethylene resin.

The laminate of the present invention may have an additional layer between the sealant layer (B) and the intermediate layer (C) except the portions where these layers contact with each other. When the laminate of the present invention has a substrate layer (A), the multilayer structure represented by substrate layer (A)/intermediate layer (C)/sealant layer (B) should be present at portions that are heat sealed when the laminate is subjected to a heat sealing process. Portions of the laminate that are not heat sealed may have an additional layer between the substrate layer (A) and the intermediate layer (C), and may have a direct contact of the substrate layer (A) and the sealant layer (B) without the intermediate layer (C). Examples of the additional layers include layers formed of olefin polymers other than the intermediate layer (C) and the sealant layer (B), and air layers.

⟨Production of laminates⟩

For example, the laminate of the present invention may be obtained by bringing the intermediate layer (C) and the sealant layer (B) in the molten state into contact with the substrate layer (A). The laminate obtained in this manner attains excellent adhesion of the substrate layer (A) with the intermediate layer (C) and the sealant layer (B). The intermediate layer (C) in the molten state may be brought into contact with the substrate by melt-extruding the intermediate layer onto the substrate. The resin compositions used for the intermediate layer and the sealant layer may be melt-extruded into shapes separately or simultaneously to produce the laminate.

The laminate of the present invention which has a substrate layer (A) may be produced by, for example, melt-extruding (extrusion laminating) the intermediate layer (C) on the substrate layer (A), and subsequently melt-extruding (extrusion laminating) the sealant layer (B) on the substrate layer (A) and the intermediate layer (C), or by melt-extruding (extrusion laminating) the intermediate layer (C) and the sealant layer (B) concurrently on the substrate layer (A).

The intermediate layer (C) and the sealant layer (B) are preferably formed at a temperature of 150 to 320° C. At such temperatures, good adhesion is obtained between the substrate (A) and the intermediate layer (C), and between the intermediate layer (C) and the sealant layer (B).

When the intermediate layer (C) is melt-extruded (extrusion laminated) on the substrate layer (A), it is preferable from the point of view of adhesion that an anchor coating treatment be applied to the side of the substrate layer (A) on which the intermediate layer (C) will be extruded and further a treatment be performed in an oxidizing atmosphere (for example, a gas (such as air) containing oxygen, in particular, ozone) at a temperature falling in the above range of the shaping temperatures (hereinafter, this treatment will be written as the ozone treatment). The anchor coating treatment is performed by coating the surface of the substrate with a known anchor coating agent, adhesive or the like such as a polyurethane, an isocyanate compound, a urethane polymer, a mixture or a reaction product of these compounds, a mixture or a reaction product of a polyester or a polyol with an isocyanate compound, or a solution thereof.

The ozone treatment is performed in an air gap by blowing a gas (such as air) containing ozone from a nozzle or a slit outlet to the side of the intermediate layer (C) that will be joined with the substrate layer (A), or the side of the substrate layer (A) on which the intermediate layer (C) will be laminated, or by spraying the gas to portions of these two layers that will be compressed to each other. When the extrusion lamination is performed at a speed of 100 m/min or more, it is preferable that the gas be sprayed to portions of the two layers that will be compressed to each other. The concentration of ozone in the ozone-containing gas is preferably not less than 1 g/m$^3$, and more preferably not less than 3 g/m$^3$. The amount of the gas sprayed is preferably not less than 0.03 L/(min·cm), and more preferably not less than 0.1 L/(min·cm) along the width (the length in the direction perpendicular to the extrusion direction) of the intermediate layer (C).

From the point of view of productivity, the lamination speed is generally 100 to 150 m/min. The air gap of a known extrusion laminator is generally 100 to 150 mm. From the point of view of adhesion, the laminate of the present invention is preferably subjected to an aging treatment immediately after it is formed. The aging treatment is performed within 12 hours after the formation of the laminate by allowing the laminate to stand in an atmosphere at a temperature of 23 to 45° C., preferably 35 to 45° C., and a humidity of 0 to 50% for 12 to 24 hours.

[Liquid Packaging Bags and Liquid-Filled Package Bags, and Methods for Production thereof]

The laminate of the present invention is particularly useful as a material for liquid packaging bags for enclosing a liquid or a viscous fluid.

A liquid packaging bag of the present invention is formed from the laminate of the present invention. More specifically, the liquid packaging bag is a bag obtained in such a manner that a single sheet of the laminate (the multilayer packaging film) in which the optional substrate layer (A), the intermediate layer (C) and the sealant layer (B) are stacked in this order is folded so that the sealant layer (B) is bent inward, or two sheets of such a laminate are placed one on top of the other so that the sealant layers (B) are opposed to each other, or the laminate of the present invention (the multilayer packaging film) is paired with other type of a film so that the sealant layer (B) and the film are opposed to each other, and sides (for example, two sides, three sides or four sides) of the films are heat sealed to form a bag. The heat sealing may be performed in a conventional manner using a known heat sealing machine. The shape of the bag is generally rectangular but may be any other shape.

A liquid-filled package bag of the present invention includes the liquid packaging bag of the present invention, and a liquid or a viscous fluid enclosed in the liquid packaging bag. In the present invention, even bags that will or already contain a viscous fluid are written as liquid packaging bags or liquid-filled package bags for the purpose of convenience.

Examples of the liquids and the viscous fluids include foods and pharmaceuticals. The liquids and the viscous fluids may contain solid substances as is the case in dressings containing granules.

The heat sealing is performed at a temperature that is not less than the melting temperature of the sealant layer (B), and the heat sealing width may be appropriately selected in accordance with the amount of a liquid or a viscous fluid enclosed in the liquid packaging bag. To facilitate taking out of the liquid or the viscous fluid from the bag, a portion that will serve as a spout may be left unsealed.

The liquid-filled package bag of the present invention may be produced through a step of packaging a liquid or a viscous fluid into the liquid packaging bag of the present invention. For example, the liquid-filled package bag may be produced using an automatic liquid/viscous fluid packaging machine so as to form a sheet in which a plurality of the liquid-filled package bags are continuously arranged in the longitudinal direction of the sheet. The liquid-filled package bags of the present invention use the liquid packaging bags of the present invention which have a wide range of packaging feasible temperatures, and thus may be produced as a sheet described above at a high speed, specifically, at a feed rate of not less than 20 m/min, preferably not less than 25 m/min, in the longitudinal direction of the sheet. The upper limit depends on factors such as the performance of the packaging machine, but may be, for example, 30 m/min.

EXAMPLES

The present invention will be described in detail based on Examples hereinbelow. However, it should be construed that the scope of the present invention is not limited to such Examples.

《 (Fabrication of Laminates (Packaging Films)) 》
(Sealant Layers)

Table 1 describes ethylene/α-olefin copolymers used as sealant layer materials in Examples and Comparative Examples. Further, Table 2 describes properties of the sealant layer materials measured by methods described later.

TABLE 1

| | Example 1 | Example 2 | Comparative Example 1 | Comparative Example 2 | Comparative Example 3 |
|---|---|---|---|---|---|
| Sealant layer materials (ethylene/α-olefin copolymers) | SP00100C | Mixture of 80 parts by mass of SP00100C and 20 parts by mass of A-4085S | KC570S | PT1450G1 | SP2090C |

Manufacturers and properties of the ethylene/α-olefin copolymers are as follows.
- Evolue (registered trademark) SP00100C: PRIME POLYMER CO., LTD.
  Metallocene catalyzed C6 comonomer LLDPE, density: 903 kg/m$^3$, MFR: 10 g/10 min
- TAFMER (registered trademark) A-4085S: Mitsui Chemicals, Inc.
  Density: 885 kg/m$^3$, MFR: 4 g/10 min
- Kernel (registered trademark) KC570S: Japan Polyethylene Corporation
  Density: 906 kg/m$^3$, MFR: 11 g/10 min
- AFFINITY (registered trademark) PT1450G1: The Dow Chemical Company
  Density: 902 kg/m$^3$, MFR: 7.5 g/10 min
- Evolue (registered trademark) SP2090C: PRIME POLYMER CO., LTD.
  Metallocene catalyzed C6 comonomer LLDPE, density: 919 kg/m$^3$, MFR: 10 g/10 min Further, the following ethylene/α-olefin copolymers were also used as sealant layer materials. Table 3 describes properties of these sealant layer materials measured by the methods described later.
- LL-1: Metallocene catalyzed C6 comonomer LLDPE, density: 900 kg/m$^3$, MFR: 7.6 g/10 min
- LL-2: Metallocene catalyzed C6 comonomer LLDPE, density: 904 kg/m$^3$, MFR: 6.9 g/10 min
- LL-3: Metallocene catalyzed C6 comonomer LLDPE, density: 903 kg/m$^3$, MFR: 7.6 g/10 min
- LL-4: Metallocene catalyzed C6 comonomer LLDPE, density: 902 kg/m$^3$, MFR: 7.6 g/10 min
- LL-5: Metallocene catalyzed C6 comonomer LLDPE, density: 903 kg/m$^3$, MFR: 7.3 g/10 min
- LL-6: Metallocene catalyzed C6 comonomer LLDPE, density: 903 kg/m$^3$, MFR: 7.0 g/10 min
- LL-7: Metallocene catalyzed C6 comonomer LLDPE, density: 903 kg/m$^3$, MFR: 6.8 g/10 min
- LL-8: Metallocene catalyzed C6 comonomer LLDPE, density: 903 kg/m$^3$, MFR: 6.4 g/10 min Example 1

A laminate (a packaging film) was produced by extrusion lamination as follows.

An extrusion laminating device was preset so that a resin would be extruded at a resin temperature of 295° C. from a T-die of an extruder having a bore diameter of 60 mm. The conditions adopted were a chill roll surface temperature of 30° C., a die width of 500 mm, and a die lip opening of 0.9 mm. While controlling the throughput so that the coating thickness at a processing rate of 80 m/min would be 25 μm and while blowing ozone at a lamination section, an intermediate layer material was extrusion laminated onto an anchor-coated substrate at a take-up speed of 80 m/min to form an intermediate layer with a thickness of 25 μm. The anchor-coated substrate was a biaxially stretched nylon film 500 mm in width and 15 μm in thickness (ONY #15 manufactured by TOYOBO CO., LTD.) that had been gravure coated with isocyanate anchor coating agents (TAKELAC (registered trademark) A-3210 and TAKENATE (registered trademark) A-3075 manufactured by Mitsui Chemicals, Inc.). The intermediate layer material used was Evolue (registered trademark) SP2090C.

Further, a sealant layer material was extrusion laminated onto the intermediate layer using the same extrusion laminating device at an extruded resin temperature of 295° C. and a take-up speed of 80 m/min to form a sealant layer with a thickness of 25 μm. A laminate was thus obtained. The sealant layer material used was "Evolue (registered trademark) SP00100C". The laminate was aged in an oven at 40° C. for 24 hours. Thereafter, slits were cut in the laminate so that the width would be 150 mm. A packaging film for evaluation was thus obtained.

The packaging film obtained was tested by the methods described later to evaluate the liquid packaging suitability. The results are described in Table 2.

Example 2

A packaging film was produced and evaluated in the same manner as in Example 1, except that the sealant layer material was changed to a mixture of 80 parts by mass of SP00100C and 20 parts by mass of A-4085S. The evaluation results are described in Table 2.

Example 3

A packaging film was produced and evaluated in the same manner as in Example 1, except that the sealant layer material was changed to LL-1. The evaluation results are described in Table 3.

Example 4

A packaging film was produced and evaluated in the same manner as in Example 1, except that the sealant layer material was changed to LL-2. The evaluation results are described in Table 3.

Example 5

A packaging film was produced and evaluated in the same manner as in Example 1, except that the sealant layer material was changed to LL-3. The evaluation results are described in Table 3.

Example 6

A packaging film was produced and evaluated in the same manner as in Example 1, except that the sealant layer material was changed to LL-4. The evaluation results are described in Table 3.

Example 7

A packaging film was produced and evaluated in the same manner as in Example 1, except that the sealant layer material was changed to LL-5. The evaluation results are described in Table 3.

Example 8

A packaging film was produced and evaluated in the same manner as in Example 1, except that the sealant layer material was changed to LL-6. The evaluation results are described in Table 3.

Example 9

A packaging film was produced and evaluated in the same manner as in Example 1, except that the sealant layer material was changed to LL-7. The evaluation results are described in Table 3.

Example 10

A packaging film was produced and evaluated in the same manner as in Example 1, except that the sealant layer material was changed to LL-8. The evaluation results are described in Table 3.

Comparative Example 1

A packaging film was produced and evaluated in the same manner as in Example 1, except that the sealant layer material was changed to KC570S. The evaluation results are described in Table 2.

Comparative Example 2

A packaging film was produced and evaluated in the same manner as in Example 1, except that the sealant layer material was changed to PT1450G1. The evaluation results are described in Table 2.

Comparative Example 3

A packaging film was produced and evaluated in the same manner as in Example 1, except that the sealant layer material was changed to SP2090C. The evaluation results are described in Table 2.

⟨Methods of Evaluating Sealant Layer Materials⟩

[Melt Flow Rate (MFR)]

The melt flow rate was measured at 190° C. under 2.16 kg load in accordance with JIS K7210-1.

[Density]

A strand obtained in the MFR measurement was heat-treated at 100° C. for 1 hour and was allowed to stand at room temperature for 1 hour. Thereafter, the density was measured by a density gradient tube method in accordance with JIS K7112.

[Melting Point, ΔH(80)/ΔH and ΔH(100)/ΔH]

Under the measurement conditions described below, a sample in a differential scanning calorimeter was heated from 0° C. to 200° C. at a rate of 10° C./min, held at 200° C. for 10 minutes, cooled to 0° C. at a rate of 10° C./min, held at 0° C. for 10 minutes and then heated to 200° C. at a rate of 10° C./min. The temperature which gave an endothermic peak during the second heating was adopted as the melting point (° C.). Further, ΔH(80)/ΔH and ΔH(100)/ΔH were calculated. Here, ΔH is the total heat of melting observed during the second heating, ΔH(80) is the heat of melting observed during the second heating from 0° C. to 80° C., and ΔH(100) is the heat of melting observed during heating from 0° C. to 100° C.

(Measurement Conditions)

Differential scanning calorimeter: Diamond DSC) manufactured by Perkin Elmer Co., Ltd.

Measurement environment: Nitrogen gas atmosphere

Amount of sample: 5 mg

Shape of sample: Pressed film (formed at 230° C., thickness: 400 μm)

Sample pan: Flat-bottomed aluminum sample pan

[Amount of neck-in]

An extrusion laminating device was preset so that a resin would be extruded at a resin temperature of 295° C. from a T-die of an extruder having a bore diameter of 60 mm. A film was extruded under conditions where the die width was 500 mm, the die lip opening was 0.9 mm and the air gap was 130 mm while controlling the throughput so that the coating thickness at a processing rate of 80 m/min would be 20 μm. The width of the film was measured.

The amount of neck-in was determined by calculating the difference between the die width 500 mm and the width of the film after shrinkage.

⟨Method of Packaging in Liquid Packaging Bags, and Methods for Evaluating Liquid Packaging Suitability⟩

The packaging film produced above such as in Example was processed on a high-speed automatic filling and sealing machine (DANGAN TYPE-III manufactured by Taisei Lamick Co., Ltd.) to form packaging bags which were then filled with a liquid and were sealed. Liquid-filled pouches were thus produced. The production conditions were as follows.

Heat-sealing temperatures: (vertical sealing temperature) 190° C., (horizontal sealing temperatures) 145 to 185° C. in increments of 5° C.

Packaging mode: Three-sided sealing

Bag dimensions: Width 75 mm×85 mm pitches in length
Content: 23° C. water

Content volume: Approximately 24 cc

Packaging speed: 25 m/min

The horizontal seals of the liquid-filled pouches were subjected to visual observation and a pressure resistance test, and were evaluated based on the following criteria.

[Appearance of Seals]

The liquid-filled pouches produced at different horizontal sealing temperatures were observed to evaluate the appearance of the horizontal seals based on the criteria below. It is desirable that the maximum horizontal sealing temperature up to which no blisters or no resin pools are generated in the horizontal seals (the maximum blister-free temperature) be higher.

AA: No resin pools (blunt knots in sealant layer and intermediate layer) and no blisters.

BB: Liquid leakage from the seal.

CC: Resin pools or blisters.

[Pressure Resistance of Liquid-Filled Pouches]

By the use of a press machine (manufactured by Komatsu Industries Corp.), a load of 100 kg was applied for 1 minute to a lateral side of each of the liquid-filled pouches produced at different horizontal sealing temperatures. The pressure resistance of the liquid-filled pouches was evaluated based on the criteria below. It is desirable that the minimum horizontal sealing temperature down to which no abnormalities occur (the minimum pressure resistant temperature) be lower.

AA: No abnormalities.

BB: Liquid leakage from the folded portion.

CC: The horizontal seal had been pushed back.

[Range of Packaging Feasible Temperatures]

The range of packaging feasible temperatures was calculated from the following equation.

Range of packaging feasible temperatures (° C.)=Maximum blister-free temperature (° C.)−Minimum pressure resistant temperature (° C.)

It is desirable that the range of packaging feasible temperatures be wider.

⟨Method for Evaluating Oil Resistance of Liquid Packaging Bags⟩
[Oil Resistance of Liquid-Filled Pouches]
(Conditions for Preparation of Oil Resistance Evaluation Samples)

Oil resistance evaluation samples (liquid packaging bags) were prepared from the packaging film produced hereinabove such as in Example under the following conditions.
Sealing temperature: 160° C.
Packaging mode: Four-sided sealing
Bag dimensions: Width 75 mm×85 mm pitches in length
Content: Water/oil=50/50 wt %
Content volume: Approximately 24 cc
(Oil Resistance Evaluation Criteria)

By the use of a pressure resistance tester (manufactured by Komatsu Industries Corp.), a load of 100 kg was applied for 1 minute to the package that had been heated at a predetermined temperature. The oil resistance was evaluated by determining the lowest temperature up to which no bag breakages or no leakages occur (hereinafter, this temperature will be written as the "heat resistant temperature"). It is desirable that the heat resistant temperature be higher.

TABLE 2

| | | | Ex. 1 | Ex. 2 | Comp. Ex. 1 | Comp. Ex. 2 | Comp. Ex. 3 |
|---|---|---|---|---|---|---|---|
| Properties of sealant layer materials (ethylene/α-olefin copolymers) | Sealant layer materials (ethylene/α-olefin copolymers) | (Units) | SP00100C | Mixture of 80 parts by mass of SP00100C and 20 parts by mass of A-4085S | KC570S | PT1450G1 | SP2090C |
| | MFR | g/10 min | 10 | 10 | 11 | 7.5 | 10 |
| | Density | kg/m³ | 903 | 903 | 906 | 902 | 919 |
| | Melting point | ° C. | 98 | 98 | 100 | 99 | 127 |
| | ΔH (80)/ΔH | — | — | 0.46 | 0.49 | 0.52 | 0.49 | 0.29 |
| | ΔH (100)/ΔH | — | — | 0.77 | 0.79 | 0.88 | 0.89 | 0.56 |
| Evaluation of packaging films | Appearance of seals/Pressure resistance of liquid-filled pouches | Horizontal sealing temperatures | | | | | |
| | | 145° C. | BB/CC | BB/CC | BB/CC | BB/CC | BB/CC |
| | | 150° C. | BB/CC | AA/CC | BB/CC | BB/CC | BB/CC |
| | | 155° C. | AA/AA | AA/AA | BB/CC | BB/CC | BB/CC |
| | | 160° C. | AA/AA | AA/AA | AA/AA | AA/AA | BB/CC |
| | | 165° C. | AA/AA | AA/AA | AA/AA | AA/AA | AA/AA |
| | | 170° C. | AA/AA | AA/AA | AA/AA | AA/AA | AA/AA |
| | | 175° C. | AA/AA | AA/AA | AA/AA | AA/AA | AA/AA |
| | | 180° C. | AA/AA | AA/AA | CC/AA | AA/AA | AA/AA |
| | | 185° C. | CC/AA | CC/AA | CC/AA | CC/AA | AA/AA |
| | | 190° C. | CC/AA | CC/AA | CC/AA | CC/AA | CC/AA |
| | Range of packaging feasible temperatures | ° C. | 25° C. | 25° C. | 15° C. | 20° C. | 20° C. |
| | Heat resistant temperature | ° C. | 80° C. | — | Not more than 75° C. | — | — |

TABLE 3

| | | | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Properties of sealant layer materials (ethylene/α-olefin copolymers) | Sealant layer materials (ethylene/α-olefin copolymers) | (Units) | LL-1 | LL-2 | LL-3 | LL-4 | LL-5 | LL-6 | LL-7 | LL-8 |
| | MFR | g/10 min | 7.6 | 6.9 | 7.6 | 7.6 | 7.3 | 7.0 | 6.8 | 6.4 |
| | Density | kg/m³ | 900 | 904 | 903 | 902 | 903 | 903 | 903 | 903 |
| | Amount of Neck-in | mm | 93 | 92 | 93 | 93 | 93 | 93 | 92 | 92 |
| | ΔH (80)/ΔH | — | 0.51 | 0.49 | 0.51 | 0.49 | 0.54 | 0.55 | 0.53 | 0.45 |
| | ΔH (100)/ΔH | — | 0.79 | 0.77 | 0.78 | 0.77 | 0.82 | 0.83 | 0.82 | 0.72 |
| | ΔH (110)/ΔH | — | 0.90 | 0.91 | 0.89 | 0.89 | 0.94 | 0.94 | 0.92 | 0.88 |
| Evaluation of packaging films | Appearance of seals/Pressure resistance of liquid-filled pouches | Horizontal sealing temperatures | | | | | | | | |
| | | 160° C. | | | | BB/CC | | | BB/CC | BB/CC |
| | | 165° C. | | | | | | | AA/AA | AA/AA |
| | | 165° C. | BB/CC | BB/CC | AA/AA | BB/CC | BB/CC | BB/CC | | |
| | | 170° C. | AA/AA | AA/AA | AA/AA | AA/AA | AA/AA | AA/AA | AA/AA | AA/AA |
| | | 175° C. | AA/AA | AA/AA | AA/AA | AA/AA | AA/AA | AA/AA | AA/AA | AA/AA |
| | | 180° C. | AA/AA | AA/AA | AA/AA | AA/AA | AA/AA | AA/AA | AA/AA | AA/AA |

TABLE 3-continued

| | | Ex. 3 | Ex. 4 | Ex. 5 | Ex. 6 | Ex. 7 | Ex. 8 | Ex. 9 | Ex. 10 |
|---|---|---|---|---|---|---|---|---|---|
| | 185° C. | AA/AA | AA/AA | AA/AA | AA/AA | AA/AA | AA/AA | AA/AA | AA/AA |
| | 190° C. | AA/AA | AA/AA | AA/AA | AA/AA | AA/AA | AA/AA | AA/AA | AA/AA |
| | 200° C. | AA/AA | AA/AA | AA/AA | AA/AA | AA/AA | AA/AA | AA/AA | AA/AA |
| Heat resistant temperature | ° C. | 85 | 95 | 85 | 85 | 90 | 90 | 95 | 95 |

The invention claimed is:

1. A laminate comprising a sealant layer (B) and an intermediate layer (C) disposed in contact with the sealant layer (B), the sealant layer (B) comprising an ethylene/α-olefin copolymer (X) satisfying the following requirements (x0) to (x3):
   - (x0) the ethylene/α-olefin copolymer (X) is a copolymer of ethylene and a C3-C20 α-olefin,
   - (x1) the melt flow rate measured at 190° C. under 2.16 kg load is 4 to 10 g/10 min,
   - (x2) the density is 890 to 910 kg/m$^3$, and
   - (x3) when the ethylene/αolefin copolymer (X) in a differential scanning calorimeter is heated from 0° C. to 200° C. at a rate of 10° C./min, held at 200° C. for 10 minutes, cooled to 0° C. at a rate of 10° C./min, held at 0° C. for 10 minutes and then heated to 200° C. at a rate of 10° C./min, the ethylene/α-olefin copolymer (X) satisfies the equations below wherein ΔH is the total heat of melting observed during the second heating in the above process, and ΔH(T) is the heat of melting observed during the second heating in the above process from 0° C. to T° C., $0.43 \leq \Delta H(80)/\Delta H \leq 0.75$ and $0.70 \leq \Delta H(100)/\Delta H \leq 0.81$.

2. The laminate according to claim 1, wherein the intermediate layer (C) is an intermediate layer comprising an ethylene resin (Y) satisfying the following requirements (y0) to (y2):
   - (y0) the ethylene resin (Y) comprises a copolymer of ethylene and a C3-C20 α-olefin,
   - (y1) the melt flow rate measured at 190° C. under 2.16 kg load is 1 to 50 g/10 min, and
   - (y2) the density is 900 to 925 kg/m$^3$.

3. The laminate according to claim 1, wherein the laminate further comprises a substrate layer (A) disposed on a side of the intermediate layer (C) opposite to the sealant layer (B), and the substrate layer (A) comprises at least one selected from the group consisting of films including at least one thermoplastic resin selected from the group consisting of polyamide resins, polyester resins, polyolefin resins, polyvinylidene chloride resins, saponified ethylene/vinyl acetate copolymers, polycarbonate resins, polystyrene resins and acrylic resins, metal foils, metal-deposited films, ceramic-deposited films, papers and nonwoven fabrics.

4. The laminate according to claim 3, wherein the laminate comprises one or more adhesives interposed between at least portions of the intermediate layer (C) and of the substrate layer (A), the adhesives being selected from the group consisting of polyurethanes, isocyanate compounds, polyesters, and mixtures and reaction products of a polyol and an isocyanate compound.

5. A liquid packaging bag formed from the laminate described in claim 1.

6. A liquid-filled package bag comprising the liquid packaging bag described in claim 5, and a liquid or a viscous fluid enclosed in the liquid packaging bag.

7. A method for producing liquid-filled package bags comprising:
   a step of packaging a liquid or a viscous fluid into a liquid packaging bag formed from the laminate described in claim 1 to produce a liquid-filled package bag,
   the liquid-filled package bag being produced as a sheet in which a plurality of the liquid-filled package bags are continuously arranged in a longitudinal direction of the sheet, the sheet being fed at a feed rate of not less than 20 m/min in the longitudinal direction of the sheet.

* * * * *